(12) United States Patent
Won et al.

(10) Patent No.: US 11,404,955 B2
(45) Date of Patent: Aug. 2, 2022

(54) METHOD FOR CONTROLLING FAULT USING SWITCHING TECHNIQUE OF THREE PHASE FOUR WIRE INTERLINKING CONVERTER

(71) Applicant: RESEARCH & BUSINESS FOUNDATION SUNGKYUNKWAN UNIVERSITY, Suwon-si (KR)

(72) Inventors: Chung Yuen Won, Gwacheon-si (KR); Kwang Su Na, Suwon-si (KR); Mi Na Kim, Suwon-si (KR); Bong Yeon Choi, Seoul (KR); Kyoung Min Kang, Suwon-si (KR); Hoon Lee, Suwon-si (KR); Chang Gyun An, Seoul (KR); Tae Gyu Kim, Seoul (KR); Jun Sin Yi, Gwacheon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 28 days.

(21) Appl. No.: 17/466,182

(22) Filed: Sep. 3, 2021

(65) Prior Publication Data

US 2022/0045601 A1 Feb. 10, 2022

Related U.S. Application Data

(63) Continuation of application No. 17/352,606, filed on Jun. 21, 2021.

(30) Foreign Application Priority Data

Aug. 4, 2020 (KR) .......................... 10-2020-0097514

(51) Int. Cl.
*H02M 1/32* (2007.01)
*H02M 7/5387* (2007.01)

(52) U.S. Cl.
CPC ......... *H02M 1/32* (2013.01); *H02M 7/53875* (2013.01)

(58) Field of Classification Search
CPC .... H02M 1/32; H02M 7/53875; H02M 1/325; H02M 7/53876; H02M 7/5387; H02H 7/122; H02P 27/06

(Continued)

(56) References Cited

U.S. PATENT DOCUMENTS 6,201,720 B1 * 3/2001 Tracy ................ H02M 7/53875
363/95
6,653,812 B1 * 11/2003 Huo .................. H02M 7/53875
318/801

(Continued)

OTHER PUBLICATIONS

Received STIC search report from EIC 2800 searcher Francisco Cueto for claim 1 dated Dec. 9, 2021. (Year: 2021).*

(Continued)

*Primary Examiner* — Shawki S Ismail
*Assistant Examiner* — Htet Z Kyaw
(74) *Attorney, Agent, or Firm* — NSIP Law

(57) ABSTRACT

A method for controlling a fault of a three phase four wire interlinking converter system according to one embodiment of the present disclosure comprises obtaining a first d-q-o coordinate plane based on an internal phase angle of output voltage produced from each phase of an inverter; converting the first d-q-o coordinate plane to a second d-q-o coordinate plane based on the o-axis configured differently from the first d-q-o coordinate plane; obtaining an output voltage vector for determining a fault location by performing d-q transform on the second d-q-o coordinate plane; determining occurrence of a fault and an area related to the fault based on the output voltage vector; and in the occurrence of the fault, allocating a zero voltage vector to the area related to the fault.

12 Claims, 16 Drawing Sheets

(58) Field of Classification Search
USPC .................................................. 363/56.01
See application file for complete search history.

(56) References Cited

U.S. PATENT DOCUMENTS

| | | | | |
|---|---|---|---|---|
| 7,548,443 | B2* | 6/2009 | Arisawa | H02M 7/53875 363/132 |
| 9,954,473 | B2* | 4/2018 | Je | H02P 27/08 |
| 11,211,880 | B2* | 12/2021 | Tajima | H02M 7/53871 |
| 2005/0035815 | A1* | 2/2005 | Cheng | H02J 3/01 327/552 |
| 2015/0008860 | A1* | 1/2015 | Lee | H02M 7/5387 318/503 |

OTHER PUBLICATIONS

Received STIC search report from EIC 2800 searcher Salim Alam for claim 7 dated Dec. 9, 2021. (Year: 2021).*

An, Chang-Gyun et al., "A New PLL Method using O-axis-Transform in One Phase Load Short Circuit of 3-Phase 4-Wire Interlinking Converter", The Korean Institute of Illuminating and Electrical Installation Engineers, Nov. 8, 2019 (pp. 22).

An, Chang-Gyun et al., "A New 3D Method under Single-Line-to-Ground Fault in Three Phase Four Wire Interlinking Converter", *The Korean Institute of Power Electronics*, Nov. 22, 2019 (pp. 106-107).

Kim, Mi-Na et al., "Interlinking Converter Considering 1-Phase Short Circuit State of AC-DC Microgrid System", The Korean Institute of Power Electronics, Nov. 22, 2019 (pp. 148-149).

Kim, Mi Na et al., "SVPWM Technique for Separating Failure Points in the Event of a One-Line Ground Fault", *Proceedings of the Korean Society of Lighting and Electrical Installations Conference*, Jul. 1, 2020 (pp. 85).

An, Chang-Gyun et al., "A New Coordinate Transformation Method for Line to Line Fault in Three-Phase Four-Wire Inverter", *2020 23rd International Conference on Electrical Machines and Systems (ICEMS)*, Jul. 1, 2020, (pp. 873-878).

* cited by examiner

Current of U,V,W Phase by SVPWM switching

Voltage Vector for SVPWM switching

Sector

METHOD FOR CONTROLLING FAULT USING SWITCHING TECHNIQUE OF THREE PHASE FOUR WIRE INTERLINKING CONVERTER

CROSS-REFERENCE TO RELATED APPLICATIONS

This application is a continuation of U.S. patent application Ser. No. 17/352,606 filed on Jun. 21, 2021 which claims the benefit under 35 USC § 119(a) of Korean Patent Application No. 10-2020-0097514 filed on Aug. 4, 2020, in the Korean Intellectual Property Office, the entire disclosure of which is incorporated herein by reference for all purposes.

BACKGROUND OF THE DISCLOSURE

Field of the Disclosure

The present disclosure relates to a method for controlling a fault using a switching technique of a three phase four wire interlinking converter.

Related Art

Computer-based equipment and devices are susceptible to problems due to a power failure and, to protect them from the power failure, Uninterruptible Power Supplies (UPSs) are used.

The UPSs are commercially available in various forms of structures, typically employing a double conversion method that connects a rectifier converting AC to DC to an inverter converting DC back to AC. Here, the double conversion method includes a structure outputting three-phase four-wire power.

An inverter supplying an three-phase four-wire output where each phase may be composed of two power switches.

On the other hand, three-phase loads are also connected to the output terminal of the inverter that outputs three-phase power. Recently, since one-phase loads are often connected, the three-phase output inverter eventually encounters a voltage unbalance problem due to load unbalance between the phases of the three-phase output power. In other words, when a short circuit occurs at a load of an interlinking converter, the converter is damaged, and system quality deteriorates due to high short circuit current.

To protect the system, a circuit breaker and a controller may eliminate a fault sector. Meanwhile, a technique for controlling each phase voltage to supply power normally to the loads connected to the phases other than a short-circuited phase is being studied.

However, as in the existing system protection methods, in the occurrence of a short circuit on a load including a one-line earth fault, if all of the sub-systems connected to the load are cut off, an unnecessary loss such as power outage may occur in a local area. Therefore, for individual voltage control, Phase Locked Loop (PLL) should be performed individually, which requires an additional controller.

Also, in detecting a fundamental wave component of unbalanced voltage through a filter, many PLL techniques for handling the unbalanced voltage have difficulty in accurately detecting the magnitude and phase of a normal output voltage component while excluding a phase creating a short-circuit.

SUMMARY

The present disclosure aims to solve the necessity and/or problem described above.

Also, the present disclosure aims to implement a new o-axis transform PPL technique which may be applied in the occurrence of a short circuit on a load of a three-phase four-wire interlinking converter.

Also, in fault management using an interlinking converter, the present disclosure aims to implement a switching combination to electrically isolate a normal distribution line by applying a zero voltage vector to a fault location when a short circuit occurs in the AC distribution network connected to a load.

A method for controlling a fault of a three-phase four-wire interlinking converter system according to one embodiment of the present disclosure comprises obtaining a first d-q-o coordinate plane based on an internal phase angle of output voltage produced from each phase of an inverter; converting the first d-q-o coordinate plane to a second d-q-o coordinate plane based on the o-axis configured differently from the first d-q-o coordinate plane; obtaining an output voltage vector for determining a fault location by performing d-q transform on the second d-q-o coordinate plane; determining occurrence of a fault and an area related to the fault based on the output voltage vector; and allocating, in the occurrence of the fault, a zero voltage vector to the area related to the fault.

Also, the determining an area related to a fault determines the area based on switching states of the output voltage vectors.

Also, the switching state means an on/off combination of switching components controlled separately by the respective output phases of the three phase AC power source.

Also, the allocating a zero voltage vector to an area related to a fault applies a symmetric space vector voltage modulation method to determine an order of providing the zero voltage vector.

A three-phase four-wire interlinking converter system according to another embodiment of the present disclosure comprises an inverter converting DC power to three-phase AC power and outputting the three-phase AC power; and a processor controlling switching components included in the inverter to control the three-phase output AC power separately for each phase, obtaining a first d-q-o coordinate plane based on an internal phase angle of output voltage produced from each phase of the inverter; converting the first d-q-o coordinate plane to a second d-q-o coordinate plane based on the o-axis configured differently from the first d-q-o coordinate plane; obtaining an output voltage vector for determining a fault location by performing d-q transform on the second d-q-o coordinate plane; determining occurrence of a fault and an area related to the fault based on the output voltage vector; and allocating a zero voltage vector to the area related to the fault.

ADVANTAGEOUS EFFECTS

The following provide advantageous effects that may be obtained in the occurrence of a one-line earth fault by applying a method for controlling a fault using a switching technique of a three-phase four-wire interlinking converter according to one embodiment of the present disclosure.

The present disclosure may accurately detect the phase and magnitude even in the occurrence of a short circuit on a load by applying a new o-axis transform PPL technique that may be applied in the occurrence of a short circuit on a load of a three-phase four-wire interlinking converter.

According to fault control using a switching technique of an interlinking converter according to the present disclosure, since a zero voltage is applied to the location of a short circuit while a normal phase voltage is applied to a phase where a short circuit has not occurred, a fault location may be separated quickly.

The present disclosure may reduce the number of circuit breakers required when microgrids are constructed.

The technical effects of the present disclosure are not limited to the technical effects described above, and other technical effects not mentioned herein may be understood to those skilled in the art to which the present disclosure belongs from the description below.

BRIEF DESCRIPTION OF THE DRAWINGS

The accompanying drawings, which are included herein as a part of detailed descriptions to help understanding the present disclosure, provide embodiments of the present disclosure and describe technical features of the present disclosure with detailed descriptions below.

DESCRIPTION OF EXEMPLARY EMBODIMENTS

In what follows, embodiments disclosed in this document will be described in detail with reference to appended drawings, where the same or similar constituting elements are given the same reference number irrespective of their drawing symbols, and repeated descriptions thereof will be omitted. The suffixes, "module" and "unit", for the constituting elements used in the following descriptions are assigned or used interchangeably only for the convenience of writing the present document and do not have separate meanings or roles distinguished from each other. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

Terms including an ordinal number such as first or second may be used to describe various constituting elements, but the constituting elements should not be limited by the terms. Those terms are used only for the purpose of distinguishing one constituting element from the others.

If a constituting element is said to be "connected" or "attached" to other constituting element, the former may be connected or attached directly to the other constituting element, but there may be a case in which another constituting element is present between the two constituting elements. On the other hand, if a constituting element is said to be "directly connected" or "directly attached" to other constituting element, it should be understood that there is no other constituting element between the two constituting elements.

A singular expression should be understood to indicate a plural expression unless otherwise explicitly stated.

In the present disclosure, the term "include" or "have" is used to indicate existence of an embodied feature, number, step, operation, element, component, or a combination thereof; and should not be understood to preclude the existence or possibility of addition of one or more other features, numbers, steps, operations, elements, components, or a combination thereof.

Figure 1:
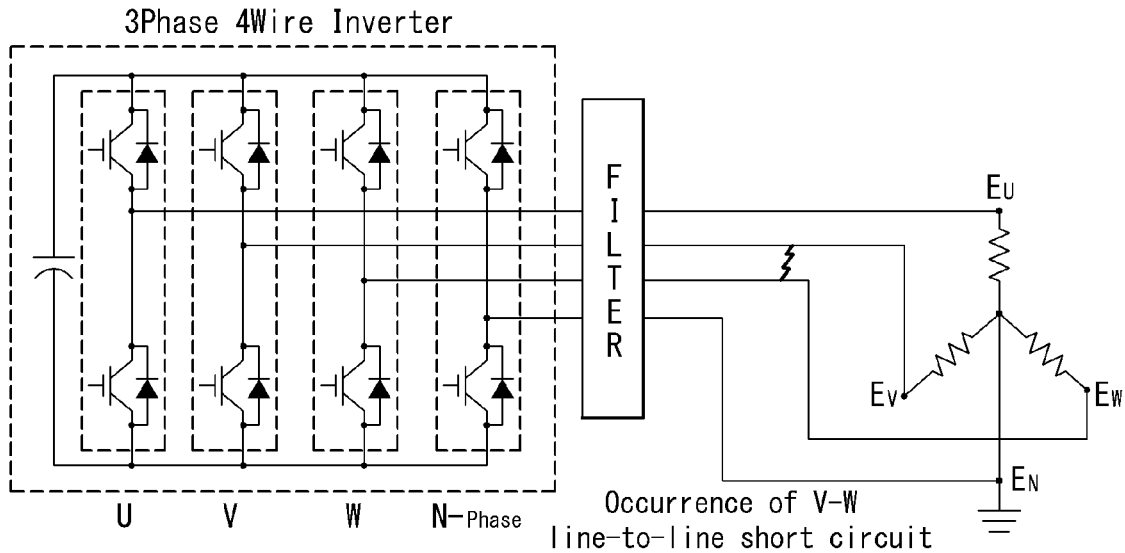
FIG. 1 is a circuit diagram illustrating a situation in which a short circuit occurs between lines of a three-phase four-wire interlinking converter system according to one embodiment of the present disclosure.

FIG. 1 is a circuit diagram illustrating a situation in which a short circuit occurs between lines of a three-phase four-wire interlinking converter system according to one embodiment of the present disclosure.

Referring to FIG. 1, a short circuit may occur between the V line and the W line in the load phase of an AC system in a standalone DC-AC microgrid.

Figure 2:
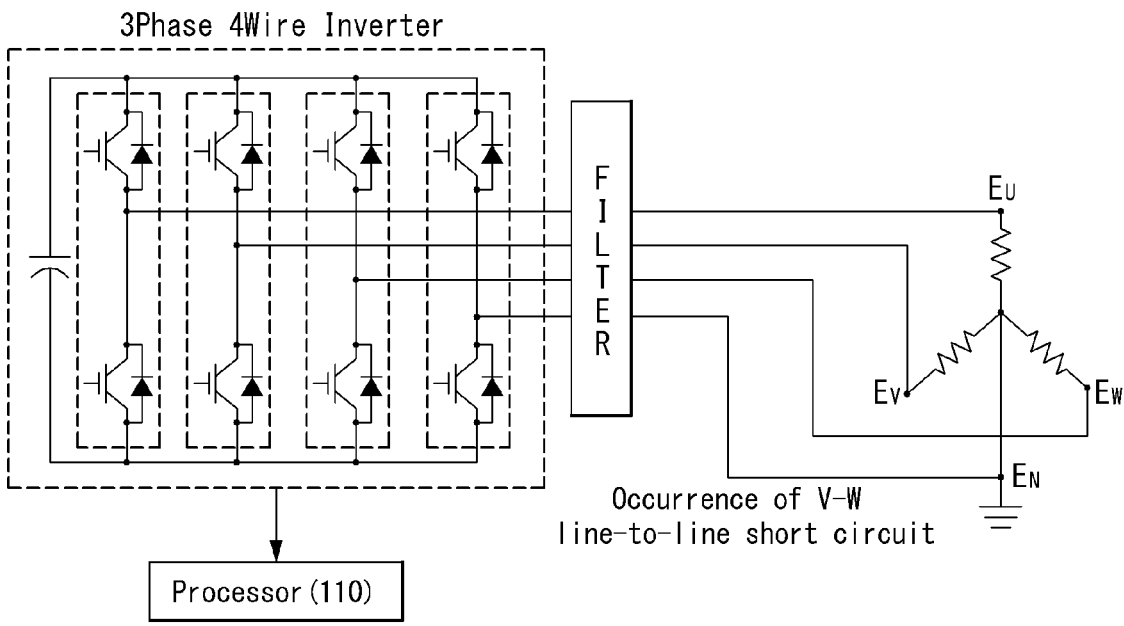
FIG. 2 is a block diagram of a three-phase four-wire interlinking converter according to one embodiment of the present disclosure.

FIG. 2 is a block diagram of a three-phase four-wire interlinking converter according to one embodiment of the present disclosure.

Referring to FIG. 2, a three-phase four-wire interlinking converter system may include an inverter 100 and at least one processor 110.

The inverter 100 may convert DC power to three-phase AC power and output the three-phase AC power.

The processor 110 may be connected to the inverter converting DC power to three-phase AC power and outputting the three-phase AC power, control switching components included in the inverter to control the three-phase output AC power separately for each phase, obtain a first d-q-o coordinate plane based on an internal phase angle of output voltage produced from each phase of the inverter, convert the first d-q-o coordinate plane to a second d-q-o coordinate plane based on the o-axis configured differently from the first d-q-o coordinate plane, obtain an output voltage vector for determining a fault location by performing d-q transform on the second d-q-o coordinate plane, determine occurrence of a fault and an area related to the fault based on the output voltage vector, and allocate a zero voltage vector to the area related to the fault.

Since the constituting elements of the three-phase four-wire interlinking converter described in FIG. 2 are an example generally included in an electronic device, the structure of the interlinking converter according to an embodiment of the present disclosure is not limited to the constituting elements described above; part of the constituting elements may be omitted and/or a new constituting element may be added depending on the needs.

The operations of the three-phase four-wire interlinking converter system applied to various embodiments of the present disclosure are not limited to the example described above, and a method for controlling a fault illustrated in FIG. 3 below may be performed by one or more processors included in the three-phase four-wire interlinking converter system. A detailed description will be given later with reference to FIG. 3.

Figure 3:
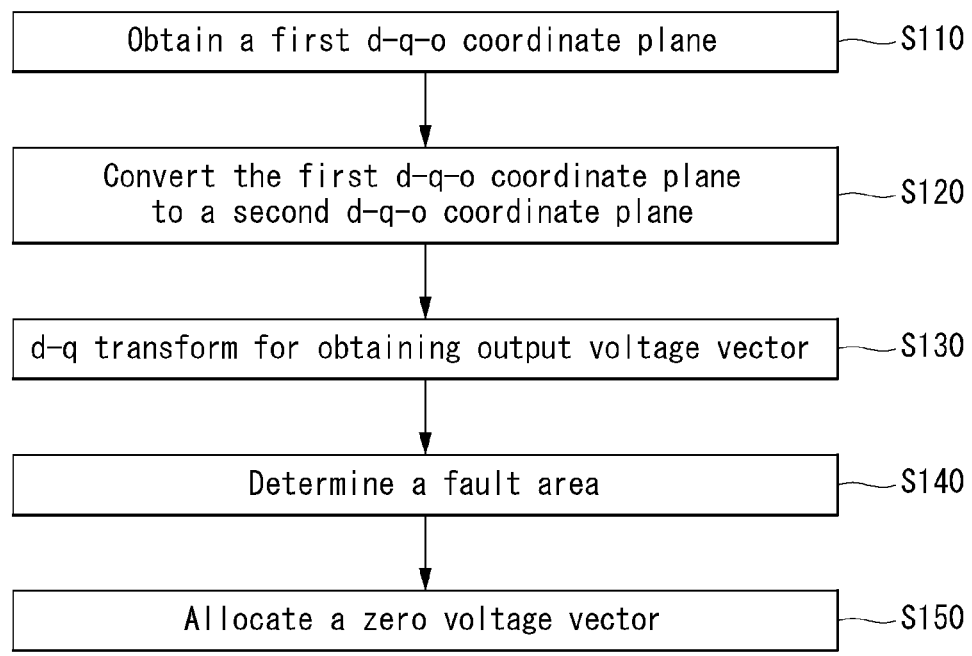
FIG. 3 is a flow diagram illustrating a method for controlling a fault of a three-phase four-wire interlinking converter system according to one embodiment of the present disclosure.

FIG. 3 is a flow diagram illustrating a method for controlling a fault of a three-phase four-wire interlinking converter system according to one embodiment of the present disclosure.

Referring to FIG. 3, the processor 110 of the three-phase four-wire interlinking converter system may obtain a first d-q-o coordinate plane based on an internal phase angle of each output voltage produced from each phase of the inverter S110.

By performing d-q-o transform through synchronized coordinate rotations on each phase, the processor 110 may obtain the first d-q-o coordinates by computing the d-, q-, and o-axis components for each phase.

The processor 110 may transform the first d-q-o coordinate plane to a second d-q-o coordinate plane based on the o-axis configured differently from the first d-q-o coordinate plane S120.

By performing $o_n$-axis coordinate transform of d- and q-axis through o-axis transform, the processor 110 may transform the first d-q-o coordinate plane to the second d-q-o coordinate plane.

In the first d-q-o coordinate transform, an o-axis waveform appears, but the $o_n$-axis value of the second d-q-o coordinate plane, which performs coordinate transform for a new $o_n$-axis plane, becomes 0, and only the waveforms of $d_n$ and $q_n$ remain. In other words, unbalanced voltage occurring in the existing o-axis may be removed through new coordinate transform of the $d_n$-$q_n$-$o_n$ axis.

By performing d-q transform with respect to the second d-q-o coordinate plane, the processor 110 may obtain an output voltage vector to determine a fault location S130.

A distorted voltage occurring along the existing o-axis is transformed to the second d-q-o coordinate plane and has a phase difference of 120 degrees with respect to the n plane through new coordinate transform of the $d_n$-$q_n$-$o_n$ axis.

To compensate for the phase difference, the processor 110 may perform d-q transform with respect to the second d-q-o coordinate plane and convert a signal having a phase difference of 120 degrees into a signal having a phase difference of 90 degrees.

The processor 110 may determine occurrence of a fault and an area related to the fault based on the output voltage vector S140.

The processor 110 may determine the occurrence of a fault and an area related to the fault and generate a space vector through an effective vector and a zero vector selected based on an output voltage vector and a switching state. The generated space vectors may be divided into the respective sector areas. The processor 110 may calculate a reference voltage $V_{ref}$ for each sector area based on the division.

When the fault occurs, the processor 110 may allocate a zero voltage vector to the area related to the fault S150.

The processor 110 may apply a symmetric space vector voltage modulation method advantageous for harmonic characteristics to determine the time to apply a vector after obtaining the synthesized reference voltage $V_{ref}$ based on each sector area.

The symmetric space vector voltage modulation method refers to a method in which the effective voltage vector exists in the center of one period after modulation and a zero voltage vector is applied before and after the effective voltage vector for $d_0/2$ hours. Using the method, the processor 110 may determine the application times of the voltage vectors and allocate the voltage vectors based on a combination of six effective voltage vectors and two zero voltage vectors selected in the occurrence of a line-to-line short circuit.

Figure 4A:
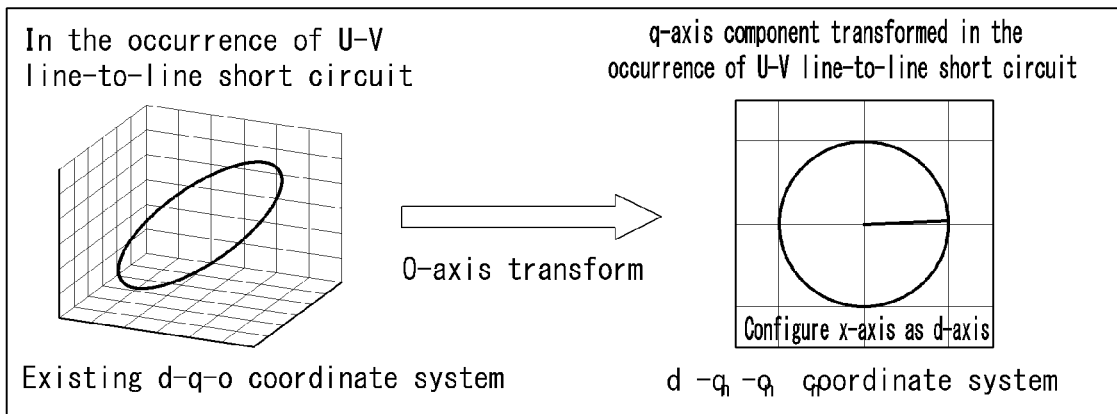
FIGS. 4A to 4C show results of performing o-axis transform to a voltage vector on a distorted voltage vector plane when a short circuit occurs in a three-phase four wire interlinking converter system according to one embodiment of the present disclosure.
Figure 4B:
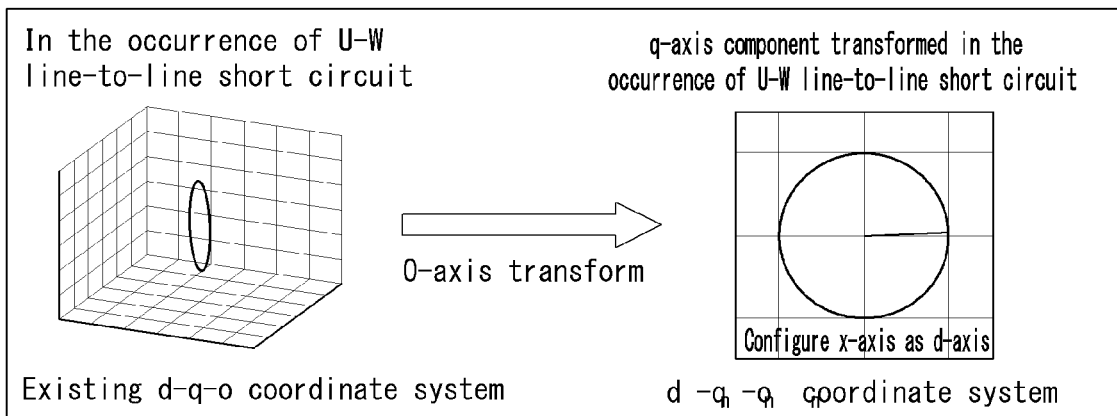
Figure 4C:
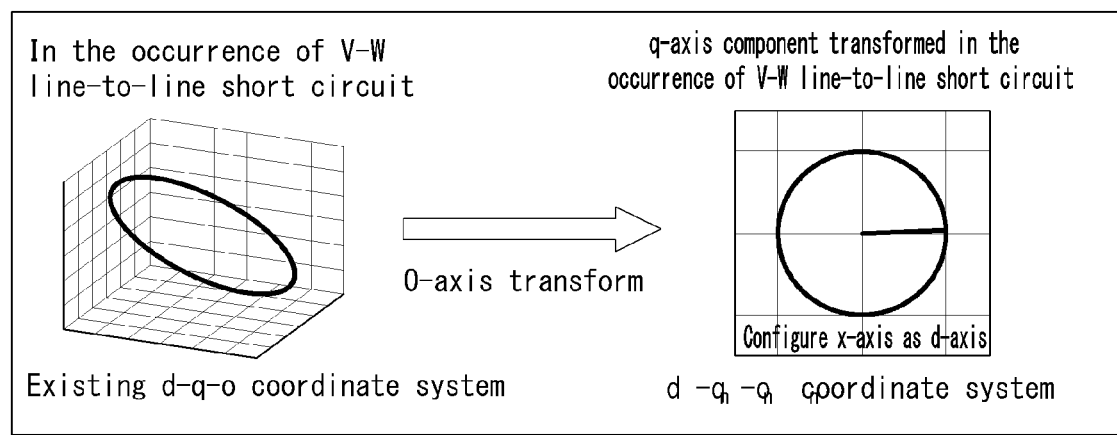

FIGS. 4A to 4C show results of performing o-axis transform to a voltage vector on a distorted voltage vector plane when a short circuit occurs in a three-phase four wire interlinking converter system according to one embodiment of the present disclosure.

The three-phase four-wire interlinking converter system is controlled by one or more processors 110 constituting the system or connected to the system, and one or more operations described in the following are stored as instructions in one or more memories constituting the system. The one or more processors 110 performs a method for controlling a fault according to various embodiments of the present disclosure using the instructions stored in the one or more memories.

Referring to FIG. 4, the processor 110 analyzes a switching plane in which a zero voltage vector is applied to the fault location of a short circuit of a power distribution network based on switching vector analysis using a switching technique of an interlinking converter. In other words, the processor 110 configures a new o-axis existing on a distorted voltage vector plane and performs coordinate transformation based on the configured o-axis. This coordinate transformation may be referred to as o-axis transform.

The interlinking converter system applied to various embodiments detects a fault of the three-phase four-wire interlinking converter system or performs compensation for the fault using the o-axis transform and the space vector voltage modulation technique (space vector PWM) in the occurrence of a line-to-line short circuit.

Space Vector Modulation Technique (Space Vector PWM, SVPWM)

The triangle wave PWM modulates each of the three-phase reference voltages while space vector PWM modulates the three-phase reference voltage into a space vector of the complex space. Here, a phase voltage may be expressed by a switching state function as shown in Eq. 1.

$$V_{an} = \frac{V_{DC}}{3}(2S_1 - S_2 - S_3) \quad [\text{Eq. 1}]$$

$$V_{bn} = \frac{V_{DC}}{3}(-S_1 + 2S_2 - S_3)$$

$$V_{cn} = \frac{V_{DC}}{3}(-S_1 - S_2 + 2S_3)$$

The output voltage vectors and switching states when SVPWM is applied to the existing three-phase four-wire interlinking converter are shown in Table 1.

TABLE 1

| | $S_1S_2S_3S_4$ | $V_{UN}$ | $V_{VN}$ | $V_{WN}$ | $v_\alpha$ | $v_\beta$ | $v_o$ | m |
|---|---|---|---|---|---|---|---|---|
| $\vec{V_1}$ | 0000 | 0 | 0 | 0 | 0 | 0 | 0 | 0 |
| $\vec{V_2}$ | 0010 | 0 | 0 | 1 | $-\frac{1}{\sqrt{6}}$ | $-\frac{1}{\sqrt{2}}$ | $\frac{1}{\sqrt{3}}$ | 1 |
| $\vec{V_3}$ | 0100 | 0 | 1 | 0 | $-\frac{1}{\sqrt{6}}$ | $\frac{1}{\sqrt{2}}$ | $\frac{1}{\sqrt{3}}$ | 1 |
| $\vec{V_4}$ | 0110 | 0 | 1 | 1 | $-\frac{2}{\sqrt{3}}$ | 0 | $\frac{2}{\sqrt{3}}$ | $\sqrt{2}$ |
| $\vec{V_5}$ | 1000 | 1 | 0 | 0 | $\frac{2}{\sqrt{3}}$ | 0 | $\frac{1}{\sqrt{3}}$ | 1 |
| $\vec{V_6}$ | 1010 | 1 | 0 | 1 | $\frac{1}{\sqrt{6}}$ | $-\frac{1}{\sqrt{2}}$ | $\frac{2}{\sqrt{3}}$ | $\sqrt{2}$ |
| $\vec{V_7}$ | 1100 | 1 | 1 | 0 | $\frac{1}{\sqrt{6}}$ | $\frac{1}{\sqrt{2}}$ | $\frac{2}{\sqrt{3}}$ | $\sqrt{2}$ |
| $\vec{V_8}$ | 1110 | 1 | 1 | 1 | 0 | 0 | $\sqrt{3}$ | $\sqrt{3}$ |
| $\vec{V_9}$ | 0001 | 0 | 0 | 0 | 0 | 0 | $-\sqrt{3}$ | $\sqrt{3}$ |
| $\vec{V_{10}}$ | 0011 | 0 | 0 | 0 | $-\frac{1}{\sqrt{6}}$ | $-\frac{1}{\sqrt{2}}$ | $-\frac{2}{\sqrt{3}}$ | $\sqrt{2}$ |
| $\vec{V_{11}}$ | 0101 | 0 | 1 | 0 | $-\frac{1}{\sqrt{6}}$ | $\frac{1}{\sqrt{2}}$ | $-\frac{2}{\sqrt{3}}$ | $\sqrt{2}$ |
| $\vec{V_{12}}$ | 0111 | 0 | 1 | 1 | $-\frac{2}{\sqrt{3}}$ | 0 | $-\frac{1}{\sqrt{3}}$ | 1 |
| $\vec{V_{13}}$ | 1001 | 1 | 0 | 0 | $\frac{2}{\sqrt{3}}$ | 0 | $-\frac{2}{\sqrt{3}}$ | $\sqrt{2}$ |
| $\vec{V_{14}}$ | 1011 | 1 | 0 | 1 | $\frac{1}{\sqrt{6}}$ | $-\frac{1}{\sqrt{2}}$ | $-\frac{1}{\sqrt{3}}$ | 1 |
| $\vec{V_{15}}$ | 1101 | 1 | 1 | 0 | $\frac{1}{\sqrt{6}}$ | $\frac{1}{\sqrt{2}}$ | $-\frac{1}{\sqrt{3}}$ | 1 |
| $\vec{V_{16}}$ | 1111 | 1 | 1 | 1 | 0 | 0 | 0 | 0 |

At this time, $V_2$ to $V_7$ and $V_{10}$ to $V_{15}$ states are called an active voltage vector and have magnitude of two-thirds of DC voltage; $V_1$, $V_8$, $V_9$, and $V_{16}$ are zero voltage vectors, indicating a state in which no load is applied.

When the one-line earth fault occurs, to apply a zero voltage to the faulty phase and a normal voltage vector to the remaining phases, the processor 110 selects only the case where the state of the faulty phase is the same as that of N phase. By using a vector selected from the operation above, a three-phase reference voltage may be expressed as one space vector in the complex space.

Figure 5A:
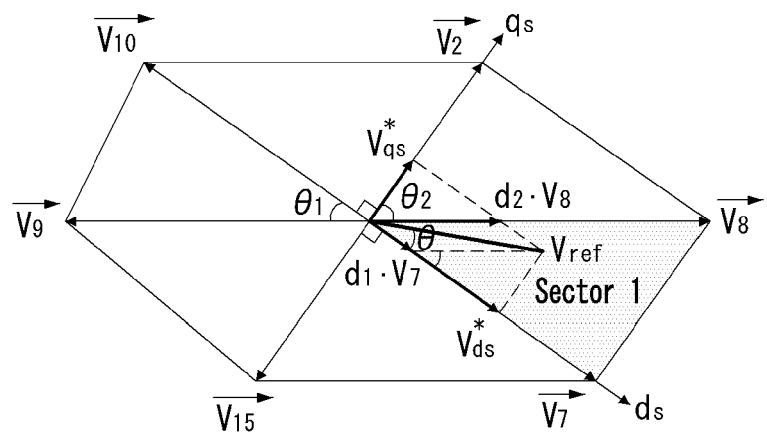
FIGS. 5A to 5C illustrate space vectors in the occurrence of a line-to-line short circuit of a three-phase four-wire interlinking converter system according to one embodiment of the present disclosure.
Figure 5B:
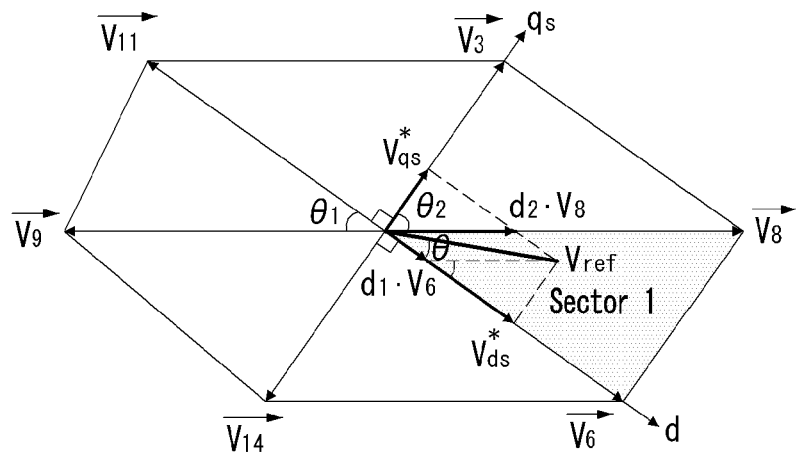
Figure 5C:
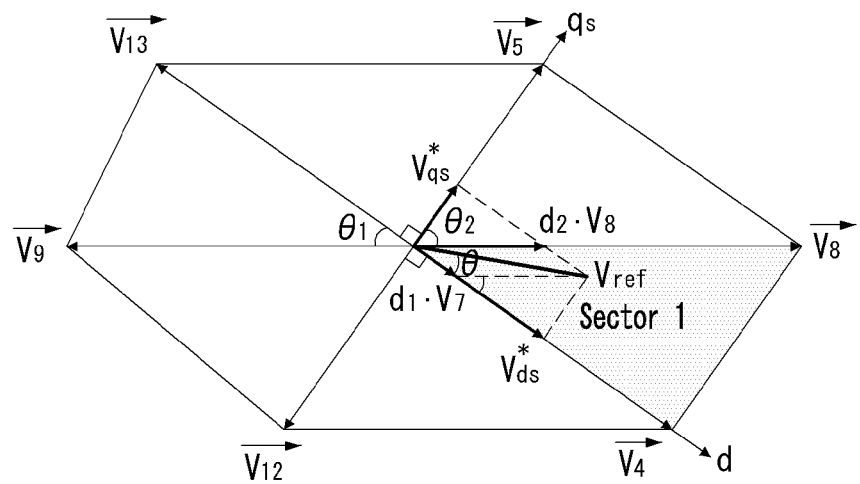

FIGS. 5A to 5C illustrate space vectors in the occurrence of a line-to-line short circuit of a three-phase four-wire interlinking converter system according to one embodiment of the present disclosure.

The processor 110 may generate a space vector through an effective vector and a zero vector selected based on an output voltage vector and a switching state of the switching component 111.

Referring to FIG. 5A, a vector selected in the occurrence of a U-V line-to-line short circuit is $\vec{V_1}$, $\vec{V_2}$, $\vec{V_7}$, $\vec{V_8}$, $\vec{V_9}$, $\vec{V_{10}}$, $\vec{V_{15}}$, $\vec{V_{16}}$, and a voltage plane depicted through the selected voltage vectors may be checked. The voltage vector plane is composed of six areas and may be depicted by two sections having different sizes. Also, by using selected vectors, a three-phase reference voltage $V_{ref}$ may be expressed by one space vector in the complex space, and the reference voltage $V_{ref}$ may be calculated for each sector area.

Referring to FIG. 5B, a vector selected in the occurrence of a U-W line-to-line short circuit is $\vec{V}_1$, $\vec{V}_3$, $\vec{V}_6$, $\vec{V}_8$, $\vec{V}_9$, $\vec{V}_{11}$, $\vec{V}_{14}$, $\vec{V}_{16}$, and a voltage plane depicted through the selected voltage vectors may be checked. The voltage vector plane is composed of six areas and may be depicted by two sections having different sizes. Also, by using selected vectors, a three-phase reference voltage $V_{ref}$ may be expressed by one space vector in the complex space, and the reference voltage $V_{ref}$ may be calculated for each sector area.

Referring to FIG. 5C, a vector selected in the occurrence of a V-W line-to-line short circuit is $\vec{V}_1$, $\vec{V}_4$, $\vec{V}_5$, $\vec{V}_8$, $\vec{V}_9$, $\vec{V}_{12}$, $\vec{V}_{13}$, $\vec{V}_{16}$, and a voltage plane depicted through the selected voltage vectors may be checked. The voltage vector plane is composed of six areas and may be depicted by two sections having different sizes. Also, by using selected vectors, a three-phase reference voltage $V_{ref}$ may be expressed by one space vector in the complex space, and the reference voltage $V_{ref}$ may be calculated for each sector area.

Figure 6A:
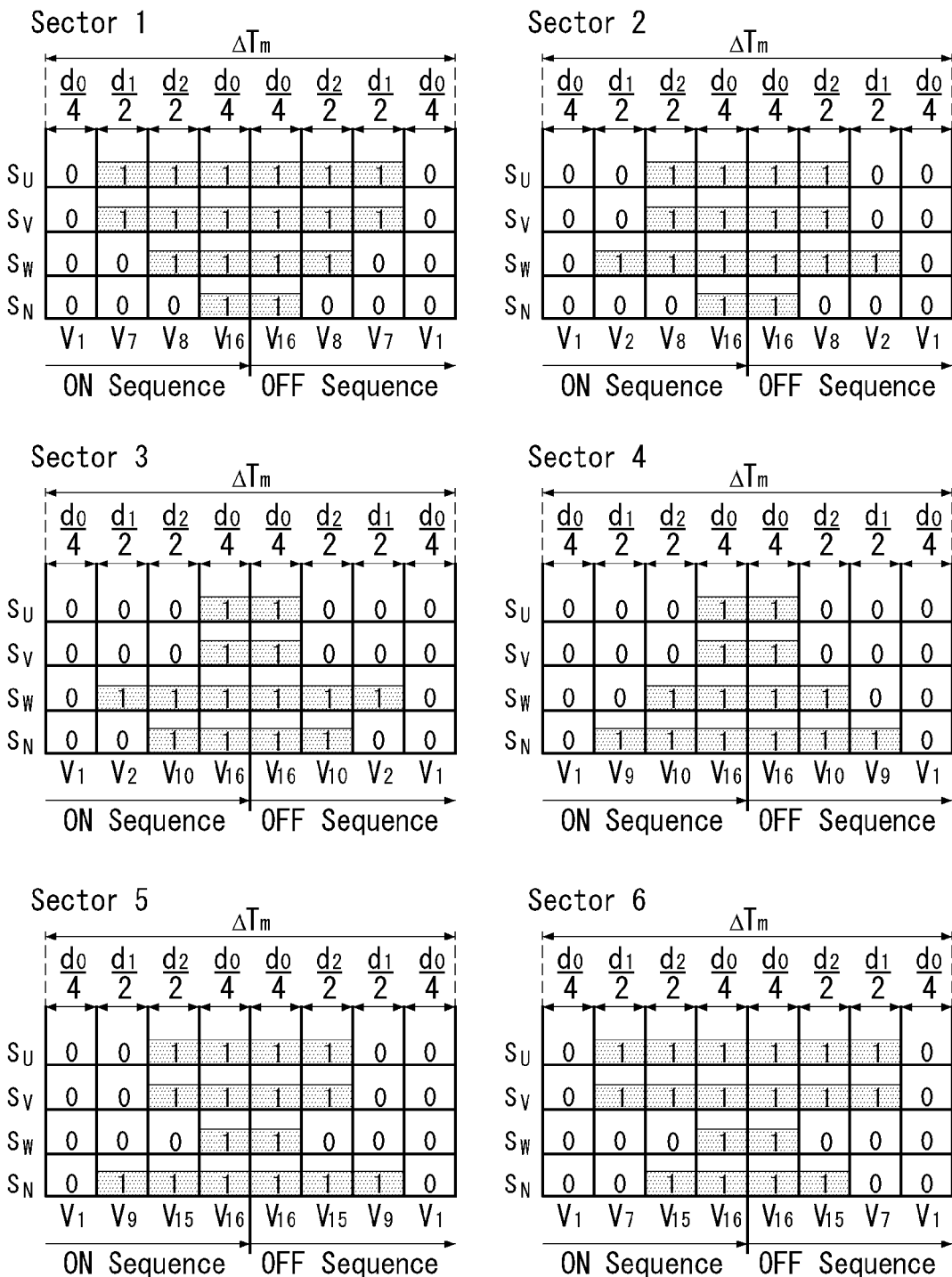
FIGS. 6A to 6C show combination results using a symmetric space vector voltage modulation method when a short circuit occurs in a three-phase four-wire interlinking converter system according to one embodiment of the present disclosure.
Figure 6B:
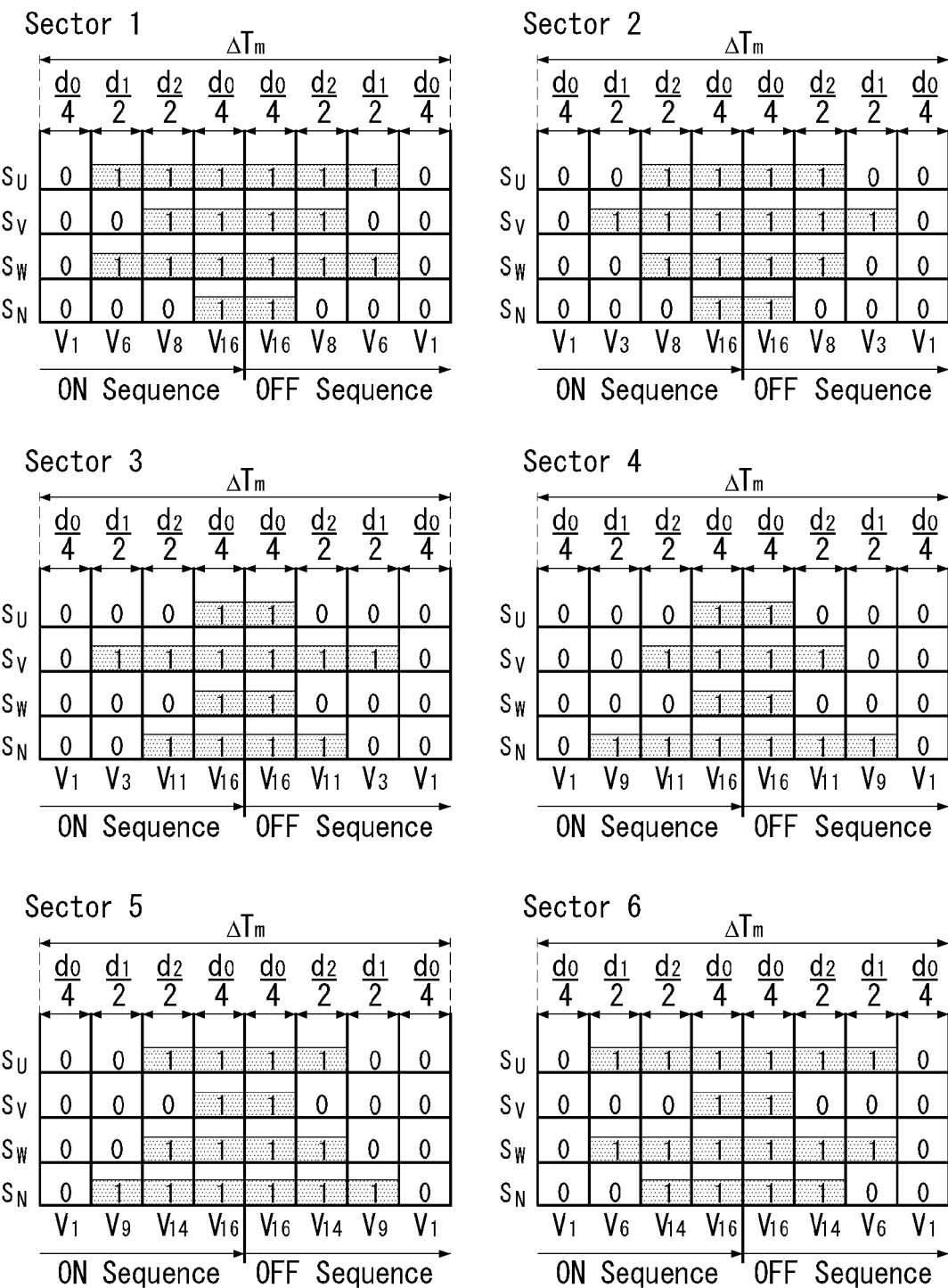
Figure 6C:
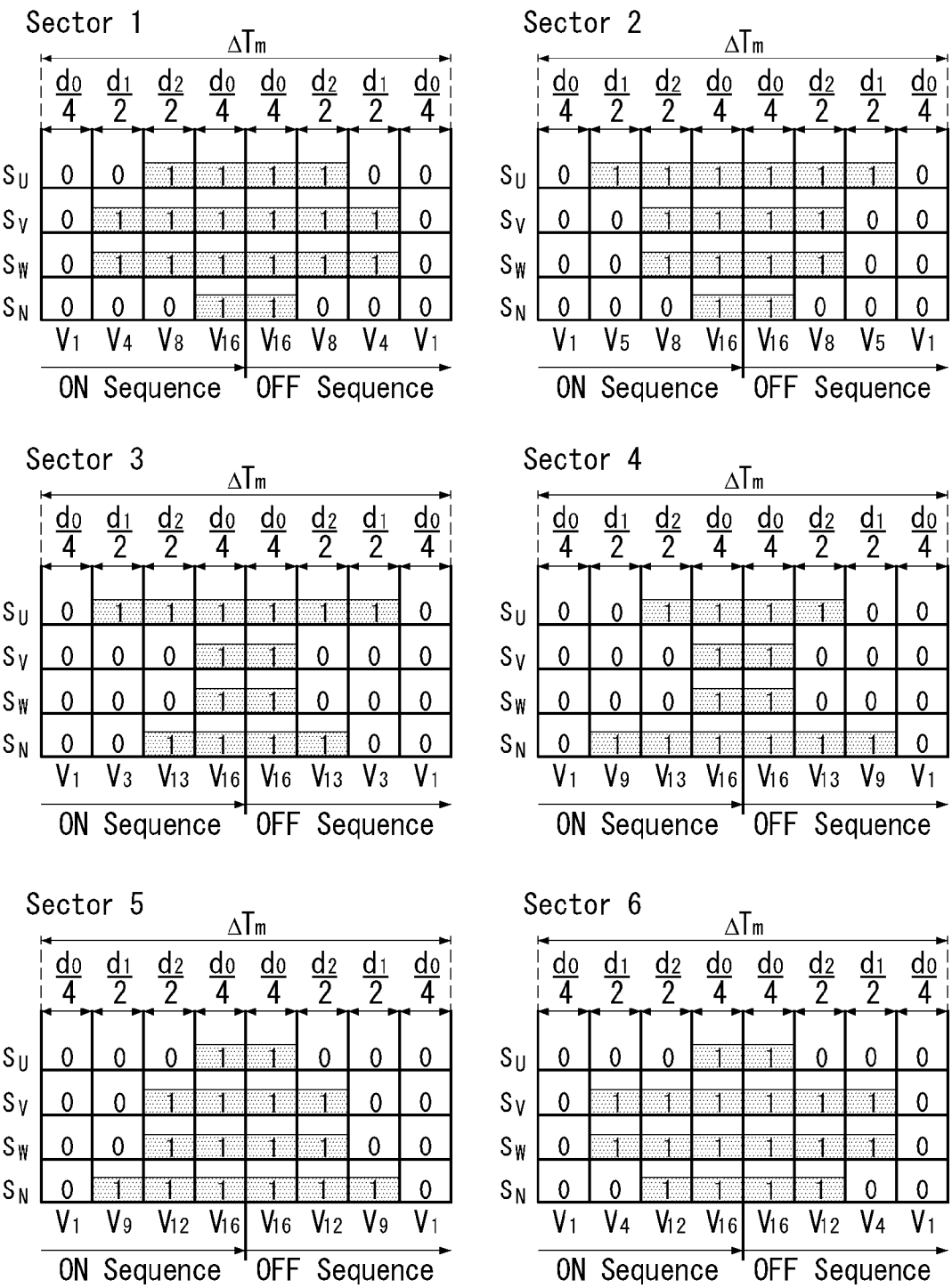

FIGS. 6A to 6C illustrate switch operations using a symmetric space vector voltage modulation method for each sector when a short circuit occurs in a three-phase four-wire interlinking converter system according to one embodiment of the present disclosure.

The processor 110 may apply a symmetric space vector voltage modulation method advantageous for harmonic characteristics to determine the time to apply a vector after obtaining the synthesized reference voltage $V_{ref}$ based on each sector area.

The symmetric space vector voltage modulation method refers to a method in which the effective voltage vector exists in the center of one period after modulation and a zero voltage vector is applied before and after the effective voltage vector for $d_0/2$ hours. Using the method, the processor 110 may determine the application times of the voltage vectors based on a combination of six effective voltage vectors and two zero voltage vectors selected in the occurrence of a line-to-line short circuit.

Symmetric space vector voltage modulation method (Symmetric SVPWM) is called so because an effective voltage vector is located in the center of a switching period, which is advantageous for harmonic characteristics, and an on-sequence and an off-sequence are symmetric to each other.

In other words, the symmetric space vector voltage modulation method, to place the effective vector in the center of the switching period, divides a zero vector by ½ over the sampling period and puts the divided zero vector on both sides of the switching period. For a zero vector located in the middle of the switching period, the method places $V_{16}$ that turns on all switches. As a result, the processor 110 turns on the switches by applying vectors in the order of $V_1$, $V_9$, $V_{13}$, and $V_{16}$ for the first sampling period using a minimum number of switches. The processor 110 turns off the switches by applying the vectors $V_{16}$, $V_{13}$, $V_9$, and $V_1$ in the reverse order for the second sampling period.

Referring to FIG. 6A, the figure shows a switch operation using the symmetric SVPWM for each sector in the case of a U-V line-to-line short circuit. Referring to FIG. 6B, the figure shows a switch operation using the symmetric SVPWM for each sector in the case of a U-W line-to-line short circuit. Referring to FIG. 6C, the figure shows a switch operation using the symmetric SVPWM for each sector in the case of a V-W line-to-line short circuit.

FIGS. 7A to 7D illustrate d-q-o transform of unbalanced voltage in the occurrence of a U-V line-to-line short circuit of a three-phase four wire interlinking converter system according to one embodiment of the present disclosure.

Referring to FIGS. 7A to 7D, the figures show that unbalanced voltages on the U, V, and W phases controlled during fault control for applying a voltage vector between U-V lines as a zero voltage vector in the case of a U-V line-to-line short circuit and simulated waveforms during the proposed d-q-o transform.

Figure 7A:
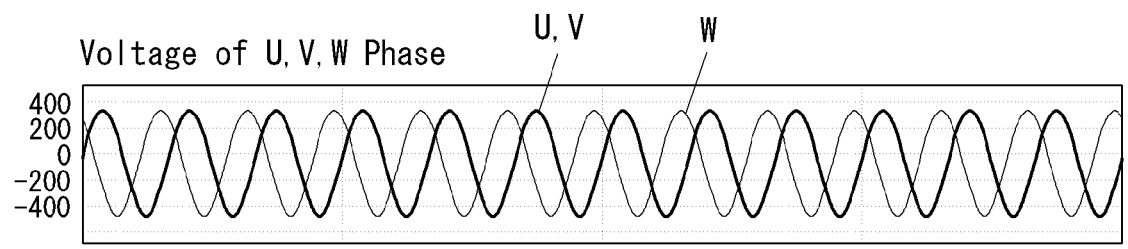
FIGS. 7A to 7D illustrate d-q-o transform of unbalanced voltage in the occurrence of a U-V line-to-line short circuit of a three-phase four wire interlinking converter system according to one embodiment of the present disclosure.

Referring to FIG. 7A, voltage waveforms on the respective U, V, and W phases may be checked in the case of a short circuit between the U-V phases.

Figure 7B:
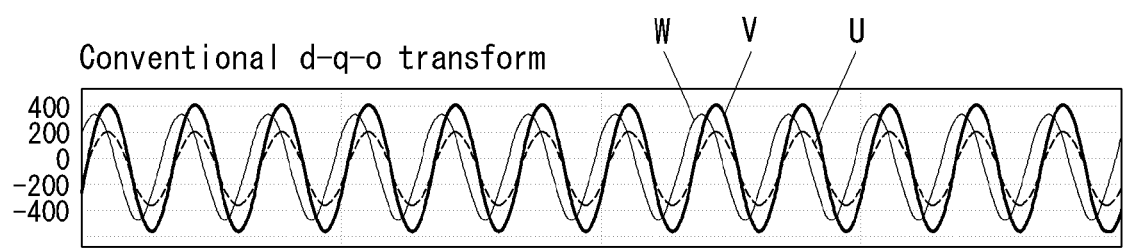

Referring to FIG. 7B, the figure shows the d-, q-, and o-axis waveforms of three phases converted through the conventional d-q-o transform in the case of a short circuit between U-V phases. The processor 110 calculates the d-, q-, and o-axis components for each phase by performing the d-q-o transform through rotational synchronization coordinate transformation of each phase. As a result, since voltage distortion exists along the q-axis and o-axis due to a short circuit between the U-V phases, it is not possible to accurately detect and track the magnitude and phase.

Figure 7C:
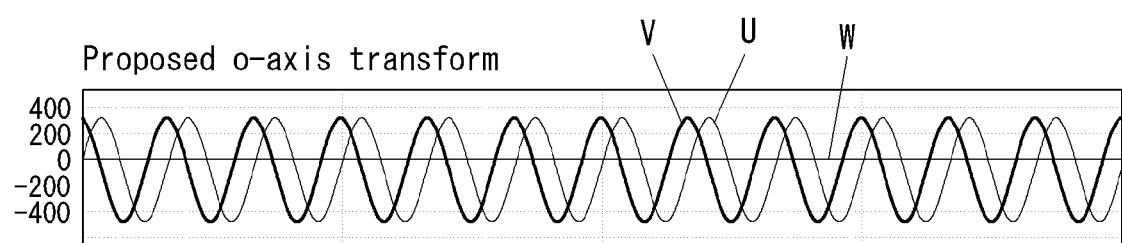

Referring to FIG. 7C, the figure shows new $d_n$, $q_n$, and $o_n$-axis waveforms obtained by performing $o_n$-axis transform on the d-axis and q-axis in the occurrence of a short circuit between U-V phases. In other words, while the o-axis waveform persists against the application of the conventional d-q-o coordinate transformation, the $o_n$-axis value becomes zero, and only the $d_n$ and $q_n$ waveforms remain when coordinate transformation is applied with respect to a new $o_n$-axis plane.

Equation 2 below shows that accurate detection of phase and magnitude is possible through a new o-axis transform PLL technique that may be applied when a short-circuit occurs on the load phase of the three-phase four-wire interlinking converter.

$$\begin{bmatrix} d \\ q \\ o \end{bmatrix} = \sqrt{\frac{2}{3}} \begin{bmatrix} 1 & -\frac{1}{2} & -\frac{1}{2} \\ 0 & \frac{\sqrt{3}}{2} & \frac{\sqrt{3}}{2} \\ \frac{1}{\sqrt{2}} & \frac{1}{\sqrt{2}} & \frac{1}{\sqrt{2}} \end{bmatrix} \begin{bmatrix} V_m \sin \omega t \\ V_m \sin\left(\omega t - \frac{2}{3}\pi\right) \\ 0 \end{bmatrix} \quad [\text{Eq. 2}]$$

Equation 2 shows the conventional d-q-o axis transform when an unbalanced three-phase voltage is applied.

$$R = \begin{bmatrix} \vec{V_5} \\ \vec{V_5} \times \vec{V_7} \times \vec{V_5} \\ \vec{V_5} \times \vec{V_7} \end{bmatrix} = \begin{bmatrix} \sqrt{\frac{2}{3}} & 0 & \frac{1}{\sqrt{3}} \\ -\sqrt{\frac{1}{6}} & \frac{1}{\sqrt{2}} & \frac{1}{\sqrt{3}} \\ -\sqrt{\frac{1}{6}} & -\frac{1}{\sqrt{2}} & \frac{1}{\sqrt{3}} \end{bmatrix} \quad [\text{Eq. 3}]$$

Equation 3 rotates a switching vector distorted elliptically onto a new o-axis using a rotation matrix R.

$$\begin{bmatrix} d_n \\ q_n \\ o_n \end{bmatrix} = \sqrt{\frac{2}{3}} R \begin{bmatrix} V_m \sin \omega t - \frac{1}{2} V_m \sin\left(\omega t - \frac{2}{3}\pi\right) \\ \frac{\sqrt{3}}{2} V_m \sin\left(\omega t - \frac{2}{3}\pi\right) \\ \frac{1}{\sqrt{2}} V_m \sin \omega t + \frac{1}{\sqrt{2}} V_m \sin\left(\omega t - \frac{2}{3}\pi\right) \end{bmatrix}$$ [Eq. 4]

Through Eq. 4, an unbalanced voltage occurring along the existing o-axis may be removed through a new coordinate transformation on the $d_n$-$q_n$-$o_n$ axis, but the component on the n plane has a phase difference of 120 degrees.

$$\begin{bmatrix} d_r \\ q_r \\ o_r \end{bmatrix} = \frac{2}{\sqrt{3}} \begin{bmatrix} \frac{\sqrt{3}}{2} & 0 & 0 \\ -\frac{1}{2} & -1 & 0 \\ 0 & 0 & \frac{\sqrt{3}}{2} \end{bmatrix} \begin{bmatrix} D_N \\ Q_N \\ O_N \end{bmatrix} = \begin{bmatrix} V_m \sin \omega t \\ V_m \cos \omega t \\ 0 \end{bmatrix}$$ [Eq. 5]

Equation 5 may perform $d_r$-$q_r$-$o_r$ compensation to convert a signal having a phase difference of 120 degrees on the n plane to a signal having a phase difference of 90 degrees.

Figure 7D:
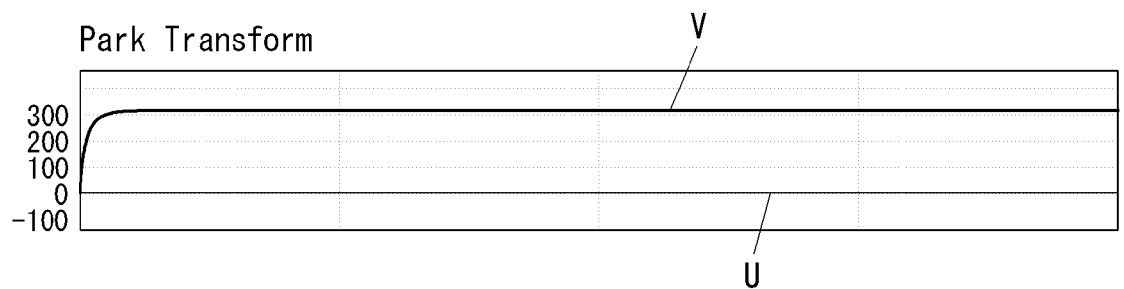

Referring to FIG. 7D, the figure shows $d_e$ and $q_e$ waveforms obtained from transformation of a synchronized coordinate system. The figure shows that the $d_e$ and $q_e$ values are kept to be constant during the synchronized coordinate transformation and when the voltage on the $d_e$-axis is controlled to be zero, the $q_e$ value becomes the magnitude of a voltage on the V and W phases not exhibiting an earth fault.

FIGS. 8A to 10D illustrate fault control of an interlinking converter in the occurrence of a line-to-line short circuit of an interlinking converter system according to one embodiment of the present disclosure.

FIGS. 8A to 10D show SVPWM waveforms during fault control, where FIGS. 8A to 8D assumes a case of a U-W line-to-line short circuit; FIGS. 9A to 9D, a V-W line-to-line short circuit; and FIGS. 10A to 10D, a W-U line-to-line short circuit. At this time, FIGS. 8A to 10D illustrate voltage control waveforms of an interlinking converter generated in the occurrence of a line-to-line short circuit.

Figure 8A:
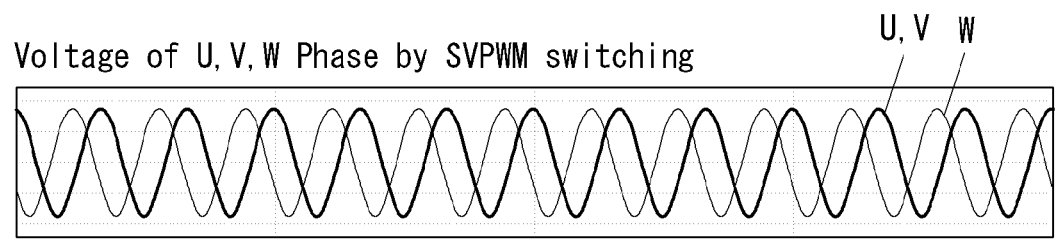
FIGS. 8A to 10D illustrate fault control of an interlinking converter in the occurrence of a line-to-line short circuit of an interlinking converter system according to one embodiment of the present disclosure.
Figure 8B:
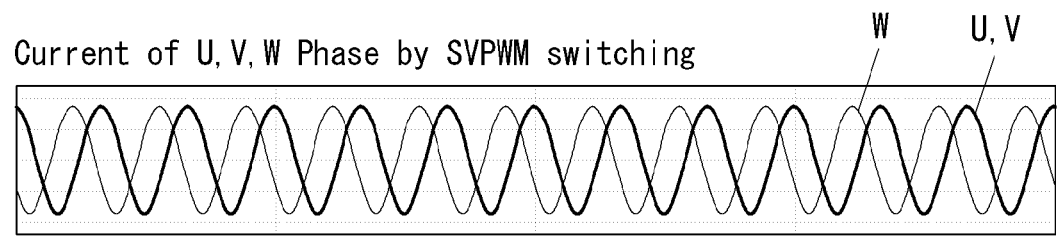
Figure 8C:
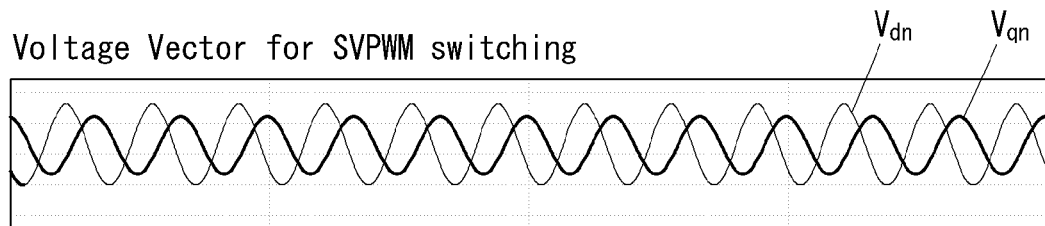
Figure 8D:
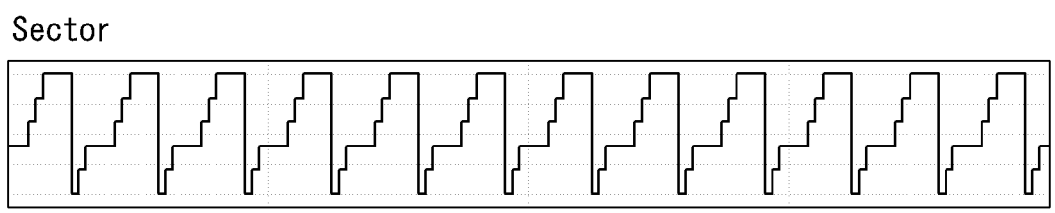

Referring to FIGS. 8A to 8D, in the occurrence of a U-V line-to-line short circuit, FIG. 8A shows the respective three-phase voltages, FIG. 8B three-phase output currents, FIG. 8C d-axis and q-axis voltage vectors for performing SVPWM, and FIG. 8D an SVPWM sector according to a position of the voltage vector.

Figure 9A:
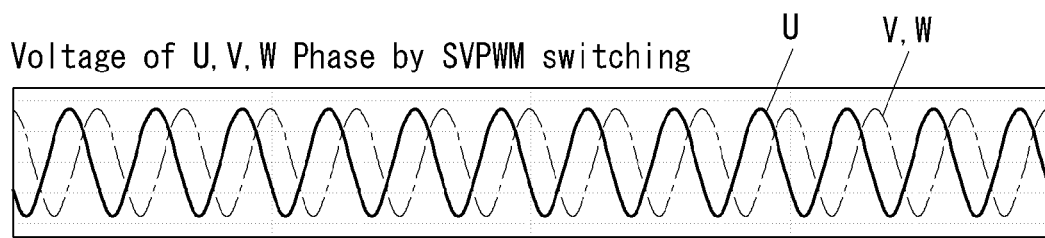
Figure 9B:
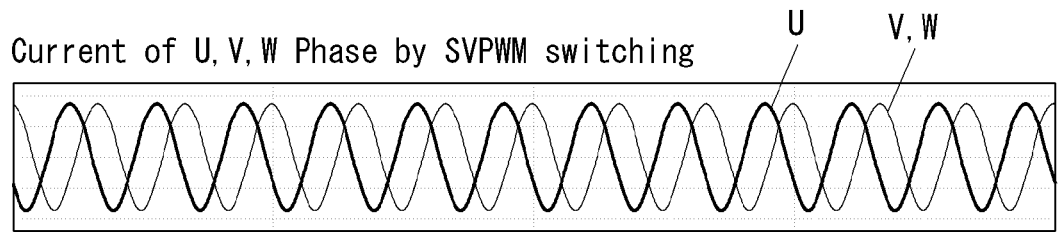
Figure 9C:
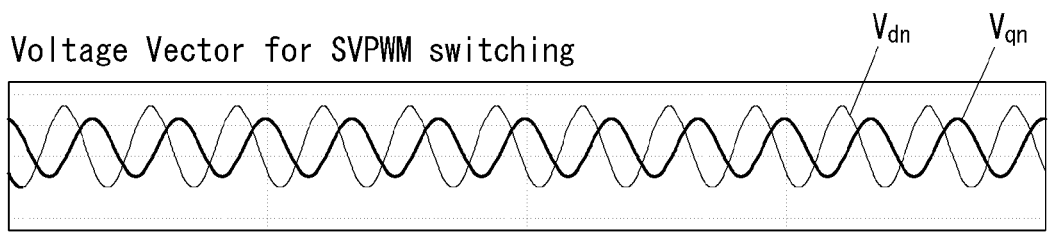
Figure 9D:
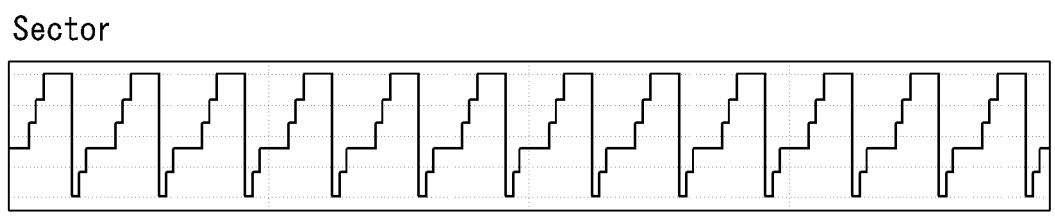

Referring to FIGS. 9A to 9D, in the occurrence of a V-W line-to-line short circuit, FIG. 9A shows the respective three-phase voltages, FIG. 9B three-phase output currents, FIG. 9C d-axis and q-axis voltage vectors for performing SVPWM, and FIG. 9D an SVPWM sector according to a position of the voltage vector.

Figure 10A:
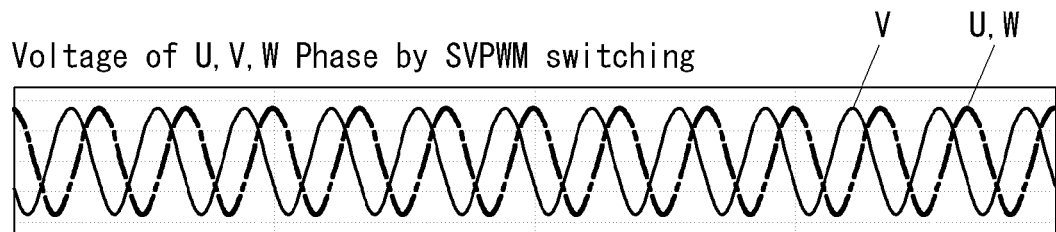
Figure 10B:
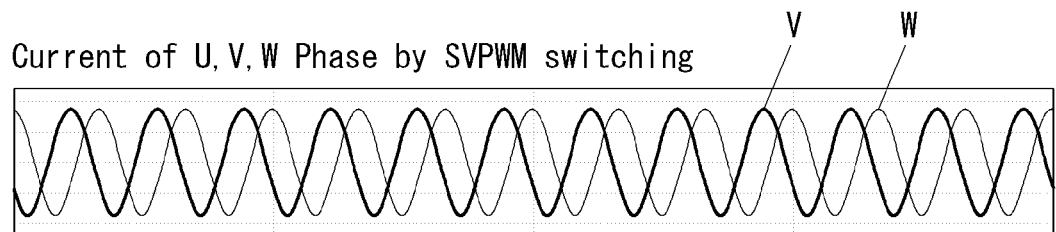
Figure 10C:
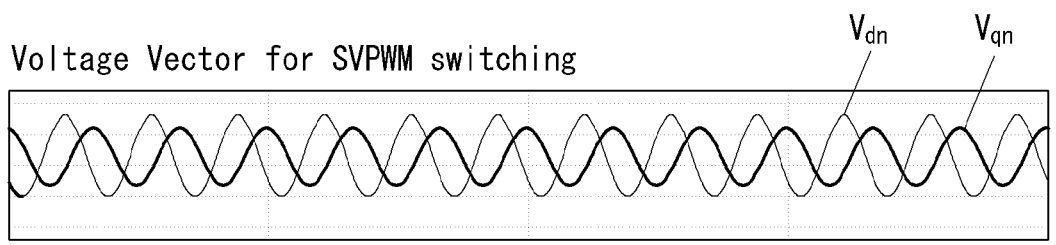
Figure 10D:
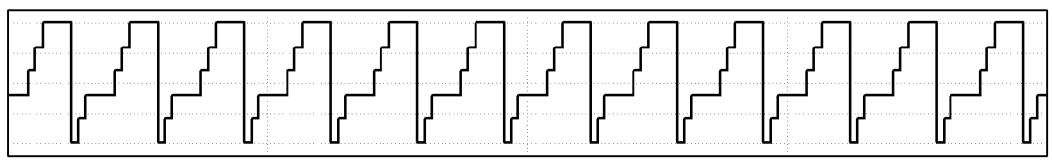

Referring to FIGS. 10A to 10D, in the occurrence of a W-U line-to-line short circuit, FIG. 10A shows the respective three-phase voltages, FIG. 10B three-phase output currents, FIG. 10C d-axis and q-axis voltage vectors for performing SVPWM, and FIG. 10D an SVPWM sector according to a position of the voltage vector.

As a result of performing the method for controlling a fault of an interlinking converter according to some embodiments of the present specification, it may be confirmed that a zero voltage vector is applied to the lines between which a short circuit occurs, and a phase voltage of 220 $V_{rms}$ is normally controlled for each phase voltage. Therefore, the method may electrically isolate only the point where the short circuit has occurred and at the same time, supply each phase voltage normally.

Figure 11:
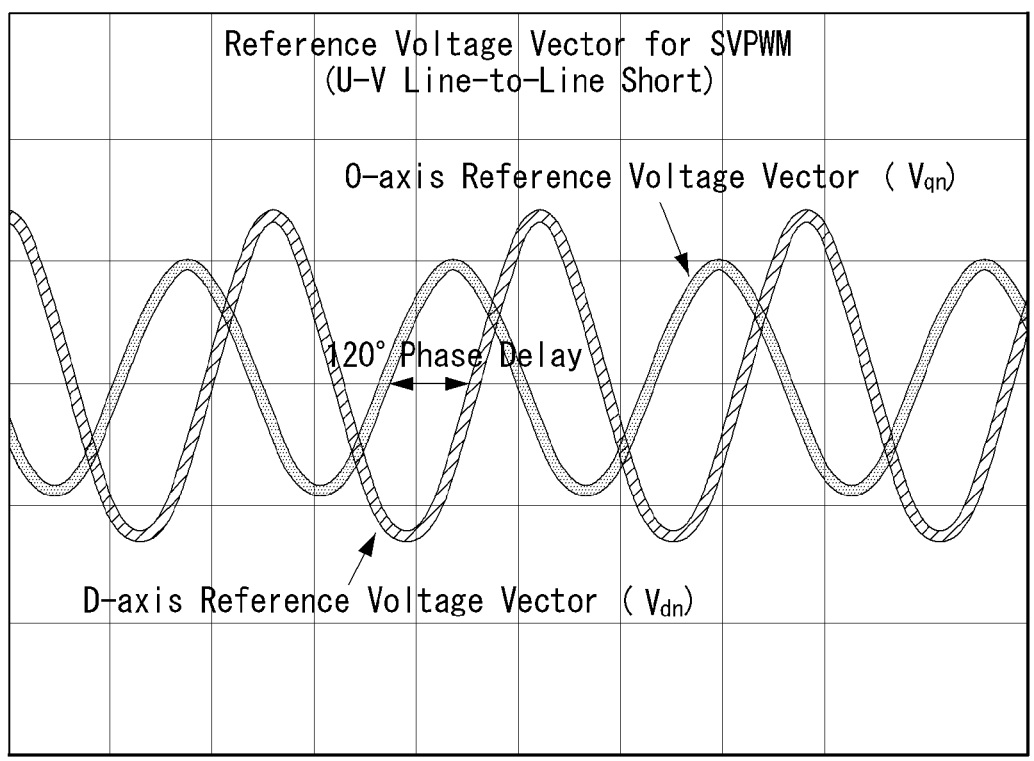
FIG. 11 illustrates d-, q-axis voltage vectors for controlling a fault in the occurrence of a U-V line-to-line short circuit of an interlinking converter according to one embodiment of the present disclosure.

FIG. 11 illustrates d-, q-axis voltage vectors for controlling a fault in the occurrence of a U-V line-to-line short circuit of an interlinking converter according to one embodiment of the present disclosure.

Referring to FIG. 11, as described with reference to the equations above, it may be confirmed that as a result of transforming an unbalanced voltage vector onto the n plane comprising d- and q-axis, a reference voltage vector waveform having a phase difference of 120 degrees is generated.

Figure 12:
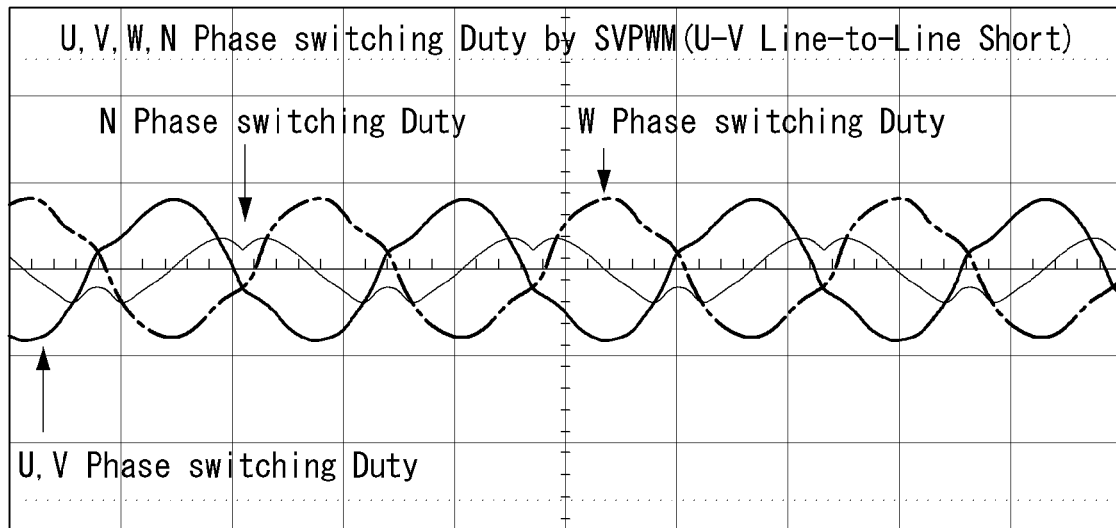
FIG. 12 illustrates switching duty on the U, V, W, N phase in the occurrence of a U-V line-to-line short circuit of an interlinking converter according to one embodiment of the present disclosure.

FIG. 12 illustrates switching duty on the U, V, W, N phase in the occurrence of a U-V line-to-line short circuit of an interlinking converter according to one embodiment of the present disclosure.

Referring to FIG. 12, it may be confirmed that through fault control, an interlinking converter applies a zero voltage vector to the lines between which a short circuit occurs, applies a normal voltage to the respective phases to which a load is connected, and checks the switching duty of each phase after performing SVPWM on the voltage vectors.

Figure 13A:
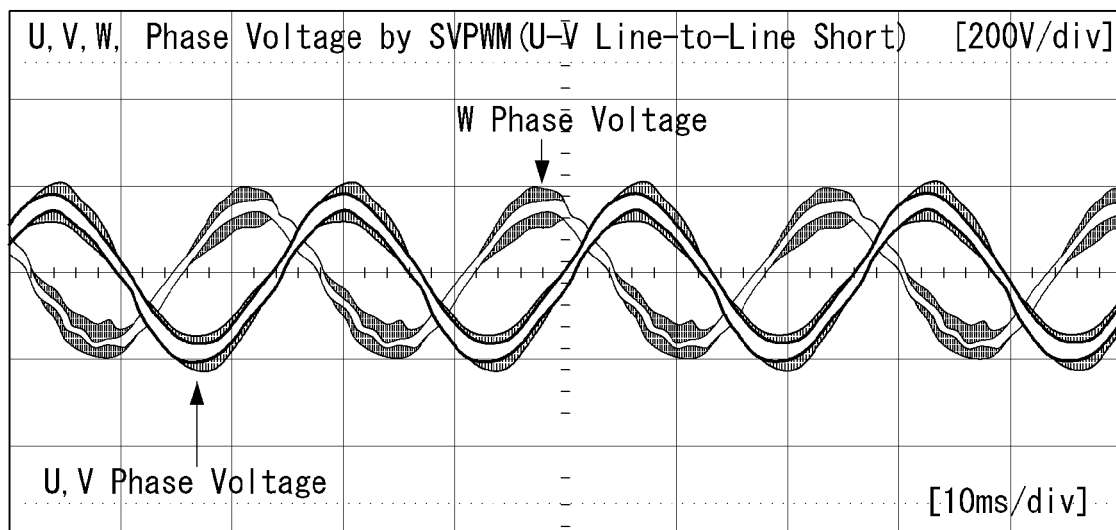
FIGS. 13A and 13B illustrates output phase voltages and line-to-line voltage waveforms of an interlinking converter when SVPWM is performed using switching duty in the occurrence of a U-V line-to-line short circuit of an interlinking converter according to one embodiment of the present disclosure.
Figure 13B:
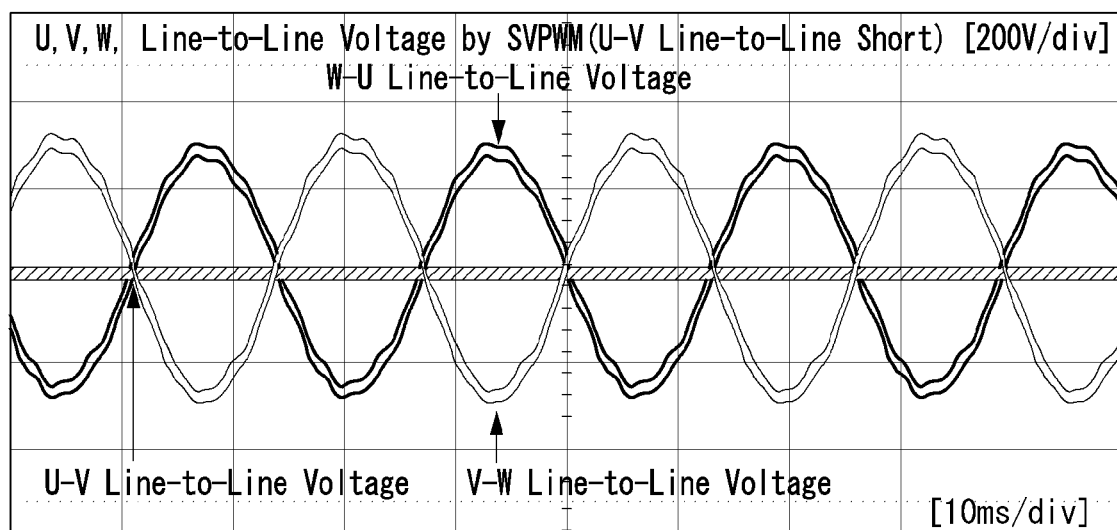

FIGS. 13A and 13B illustrate output phase voltages and line-to-line voltage waveforms of an interlinking converter when SVPWM is performed using the switching duty of FIG. 12.

Referring to FIG. 13A, the U and V phase output in-phase 128 V rated voltage while W phase outputs 128V voltage having a phase difference of 240 degrees.

Referring to FIG. 13B, since the U-V line-to-line voltage is short-circuited, a zero voltage is produced by application of a zero voltage vector.

Therefore, the short-circuit section may be electrically cut off with a zero voltage, normal AC voltage is supplied to all of the U, V, and W phases for household power using the respective phase loads, and thereby, only the fault sector may be separated. In particular, the proposed method for controlling a fault may supply power to all phases in the case of a line-to-line short circuit, and at the same time, may separate the fault sector. Compared to a secure cooperation method using the existing circuit breaker, the fault sector may be quickly separated by changing the switching method. In the case of a small microgrid using phase loads, power may be supplied smoothly.

The present disclosure may be implemented in the form of computer-readable code in a recording medium storing programs. The computer-readable recording medium includes all kinds of recording devices storing data that may be read by a computer system. Examples of a computer-readable recording medium include a Hard Disk Drive (HDD), a Solid State Disk (SSD), a Silicon Disk Drive (SDD), a ROM, a RAM, a CD-ROM, a magnetic tape, a floppy disk, an optical data storage device, and implementation in the form of carrier waves (for example, transmission through the Internet). Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

What is claimed is:

1. A method for controlling fault of a three phase four wire interlinking converter, the method comprising:

obtaining a first d-q-o coordinate plane based on an internal phase angle of output voltage produced from each phase of an inverter;

converting the first d-q-o coordinate plane to a second d-q-o coordinate plane based on the o-axis configured differently from the first d-q-o coordinate plane;

obtaining an output voltage vector for determining a fault location by performing d-q transform on the second d-q-o coordinate plane, wherein a signal having a phase difference of 120 degrees is converted into a signal having a phase difference of 90 degrees;

determining occurrence of a fault and an area related to the fault based on the output voltage vector; and allocating, in the occurrence of the fault, a zero voltage vector to the area related to the fault, wherein a symmetric space vector voltage modulation method is applied to determine an order of providing the zero voltage vector, wherein the symmetric space vector voltage modulation method refers to a method in which an effective voltage vector exists in the center of one period after modulation and the zero voltage vector is applied before and after the effective voltage vector for a specific time, and wherein the specific time is determined based on a combination of six effective voltage vectors and two zero voltage vectors selected in an occurrence of a line-to-line short circuit.

2. The method of claim 1, wherein the determining an area related to the fault comprises:

generating a space vector using the effective voltage vector and the zero vector selected based on the output voltage vector and a switching state of a switching component, wherein the space vector are generated for each sector area; and calculating a reference voltage for the each sector area based on the space vector.

3. The method of claim 2, wherein the each sector area is composed of six areas on a voltage vector plane, and the six areas are divided by two sections having different sizes, and wherein the reference voltage is calculated based on a magnitude of vector selected in a clockwise direction.

4. The method of claim 3, wherein a voltage vector selected for each of a U-V line-to-line short circuit, a U-W line-to-line short circuit and a V-W line-to-line short circuit has a different value one another.

5. The method of claim 1, wherein the determining an area related to the fault determines the area related to the fault based on switching state of the output voltage vectors, and wherein the switching state means an on/off combination of a switching component controlled separately by the respective output phases of the three phase AC power source.

6. The method of claim 5, wherein the switching component turns on switches by applying vectors in a first order for a first sampling period, and turns off the switches by applying in the reverse order of the first order for a second sampling period.

7. A three phase four wire interlinking converter system, the system comprising:

an inverter converting DC power to three phase AC power and outputting the three phase AC power; and a processor controlling switching components included in the inverter to control the three phase output AC power separately for each phase, wherein the processor is configured to:

obtain a first d-q-o coordinate plane based on an internal phase angle of output voltage produced from the each phase of the inverter;

convert the first d-q-o coordinate plane to a second d-q-o coordinate plane based on the o-axis configured differently from the first d-q-o coordinate plane;

obtain an output voltage vector for determining a fault location by performing d-q transform on the second d-q-o coordinate plane, wherein a signal having a phase difference of 120 degrees is converted into a signal having a phase difference of 90 degrees;

determine occurrence of a fault and an area related to the fault based on the output voltage vector; and allocate, in the occurrence of the fault, a zero voltage vector to the area related to the fault, wherein a symmetric space vector voltage modulation method is applied to determine an order of providing the zero voltage vector, wherein the symmetric space vector voltage modulation method refers to a method in which an effective voltage vector exists in the center of one period after modulation and a the zero voltage vector is applied before and after the effective voltage vector for a specific time, and wherein the specific time is determined based on a combination of six effective voltage vectors and two zero voltage vectors selected in an occurrence of a line-to-line short circuit.

8. The system of claim 7, wherein the processor is configured to:

generate a space vector using the effective voltage vector and the zero vector selected based on the output voltage vector and a switching state of a switching component, wherein the space vector are generated for each sector area; and calculate a reference voltage for the each sector area based on the space vector.

9. The system of claim 8, wherein the each sector area is composed of six areas on a voltage vector plane, and the six areas are divided by two sections having different sizes, and wherein the reference voltage is calculated based on a magnitude of vector selected in a clockwise direction.

10. The system of claim 9, wherein a voltage vector selected for each of a U-V line-to-line short circuit, a U-W line-to-line short circuit and a V-W line-to-line short circuit has a different value one another.

11. The system of claim 7, wherein the processor is configured to determine the area related to the fault based on a switching state of the output voltage vectors, and wherein the switching state means an on/off combination of a switching component of the switching components controlled separately by the respective output phases of the three phase AC power source.

12. The system of claim 11, wherein the switching component turns on switches by applying vectors in a first order for a first sampling period, and turns off the switches by applying the in the reverse order of the first order for thea second sampling period.

* * * * *